(12) United States Patent
Boillot

(10) Patent No.: US 8,904,312 B2
(45) Date of Patent: Dec. 2, 2014

(54) METHOD AND DEVICE FOR TOUCHLESS SIGNING AND RECOGNITION

(75) Inventor: Marc Boillot, Plantation, FL (US)

(73) Assignee: NaviSense, Plantation, FL (US)

( * ) Notice: Subject to any disclaimer, the term of this patent is extended or adjusted under 35 U.S.C. 154(b) by 1569 days.

(21) Appl. No.: 11/936,777

(22) Filed: Nov. 7, 2007

(65) Prior Publication Data

US 2011/0041100 A1    Feb. 17, 2011

Related U.S. Application Data

(60) Provisional application No. 60/865,166, filed on Nov. 9, 2006, provisional application No. 60/865,167, filed on Nov. 9, 2006.

(51) Int. Cl.
    *G06F 3/033*      (2013.01)

(52) U.S. Cl.
    USPC ............................................... 715/863

(58) Field of Classification Search
    CPC ........ G06F 3/011; G06F 3/017; G06F 3/0304
    USPC ............................................... 715/863
    See application file for complete search history.

(56) References Cited

U.S. PATENT DOCUMENTS

| | | | | |
|---|---|---|---|---|
| 3,815,418 | A | * | 6/1974 | Bradley ..................... 73/382 R |
| 5,274,363 | A | | 12/1993 | Koved |
| 5,818,735 | A | * | 10/1998 | Tigwell et al. ............... 702/176 |
| 6,130,663 | A | | 10/2000 | Null |
| 6,137,427 | A | | 10/2000 | Binstead |
| 6,313,825 | B1 | | 11/2001 | Gilbert |
| 6,937,227 | B2 | | 8/2005 | Qamhiyah |
| 7,078,911 | B2 | | 7/2006 | Cehelnik |
| 7,081,884 | B2 | | 7/2006 | Kong |
| 7,092,109 | B2 | | 8/2006 | Satoh |
| 7,130,754 | B2 | | 10/2006 | Satoh |
| 2003/0132913 | A1 | | 7/2003 | Issinski |
| 2003/0156756 | A1 | * | 8/2003 | Gokturk et al. ............... 382/190 |
| 2004/0178995 | A1 | * | 9/2004 | Sterling ..................... 345/173 |
| 2004/0189720 | A1 | * | 9/2004 | Wilson et al. ................ 345/863 |
| 2005/0212750 | A1 | * | 9/2005 | Marvit et al. ................ 345/156 |
| 2005/0257174 | A1 | * | 11/2005 | Wilson ......................... 715/863 |
| 2006/0010400 | A1 | * | 1/2006 | Dehlin et al. ................ 715/856 |
| 2006/0161871 | A1 | | 7/2006 | Hotelling |
| 2006/0164241 | A1 | | 7/2006 | Makela |
| 2006/0224429 | A1 | | 10/2006 | Mathew |
| 2006/0228149 | A1 | * | 10/2006 | Harley ..................... 400/486 |
| 2006/0256082 | A1 | * | 11/2006 | Cho et al. .................... 345/156 |
| 2006/0256090 | A1 | | 11/2006 | Huppi |
| 2007/0127039 | A1 | | 6/2007 | Njolstad |
| 2008/0005703 | A1 | * | 1/2008 | Radivojevic et al. ......... 715/863 |

\* cited by examiner

*Primary Examiner* — Boris Pesin
*Assistant Examiner* — Angie Badawi

(57) ABSTRACT

A touchless sensor device (110) for touchless signing and recognition is provided. The sensor device can include a recognition engine (114) for recognizing at least one finger sign (140), and a controller (120) for composing a text from the recognized at least one finger sign and providing predictive texting. A recognized pattern can be an alphanumeric character or a finger gesture. The controller can generate a trace (145) from the finger sign. The trace can include spatio-temporal information (153) that is characteristic to a touchless writing style. The controller can provide text messaging services, email composition services, biometric identification services, phone dialing, and navigation entry services through touchless finger signing.

22 Claims, 12 Drawing Sheets

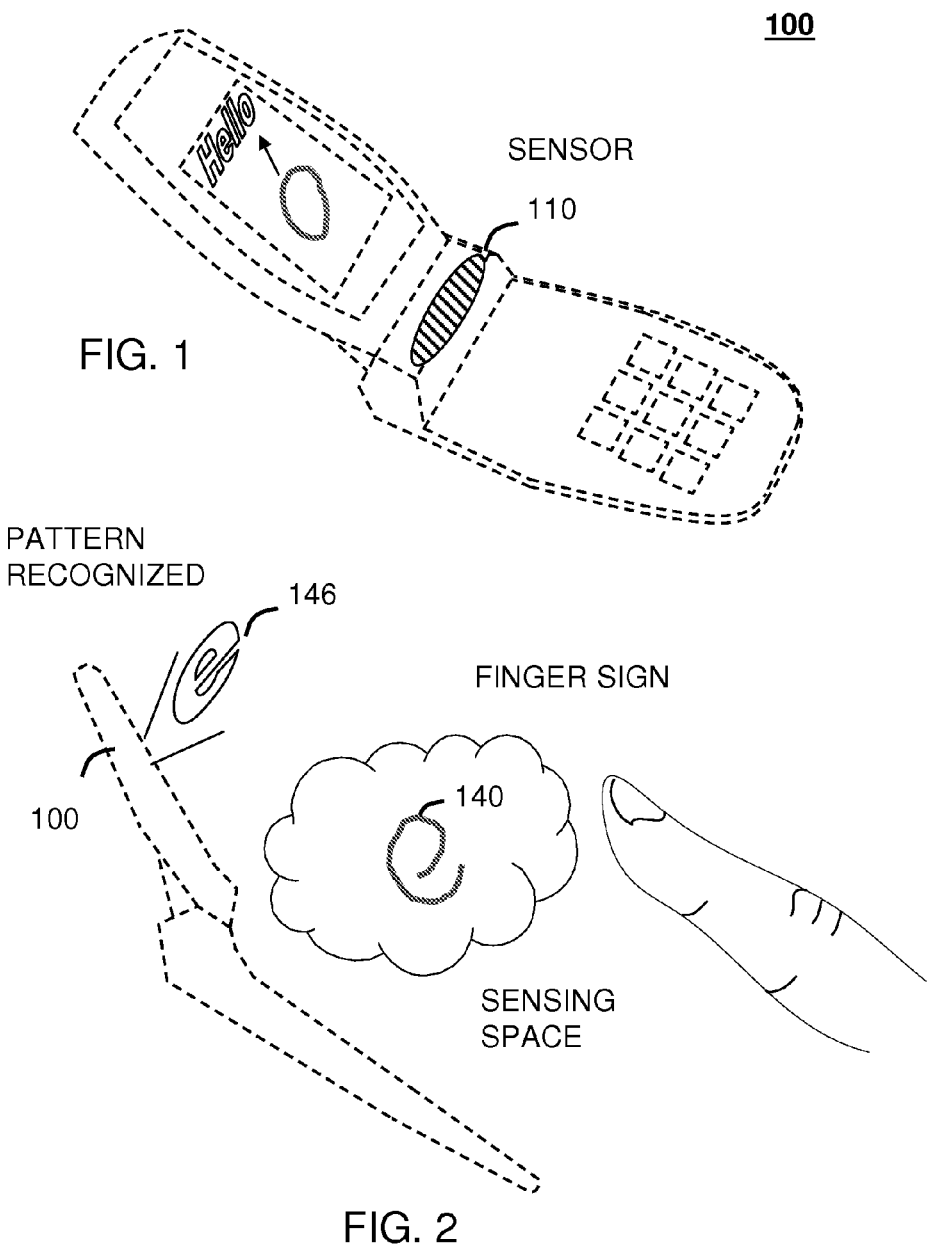

TEXT ENTRY NAVIGATION
TEXT MESSAGING
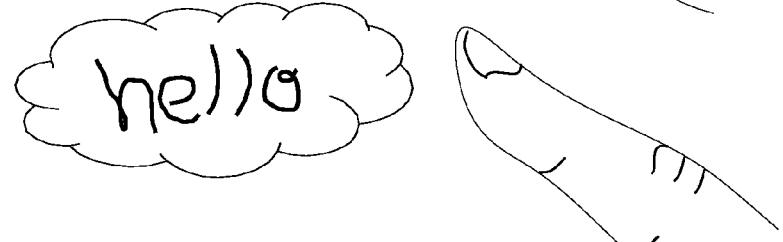
BIOMETRIC IDENTIFICATION
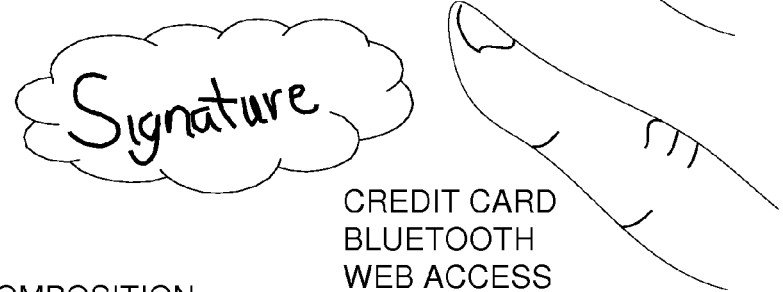
CREDIT CARD
BLUETOOTH
WEB ACCESS
EMAIL COMPOSITION
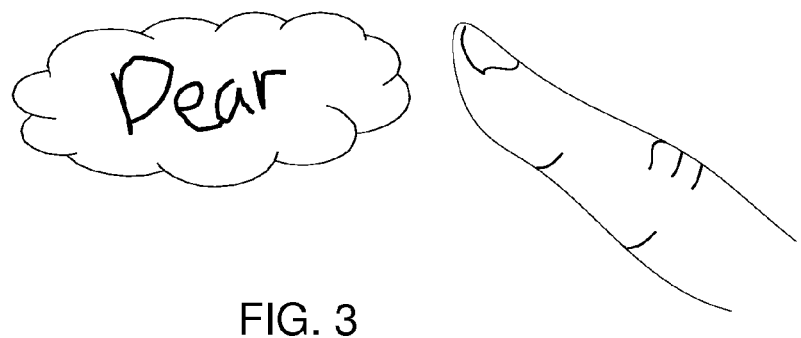
FIG. 3

NEURAL NETWORK

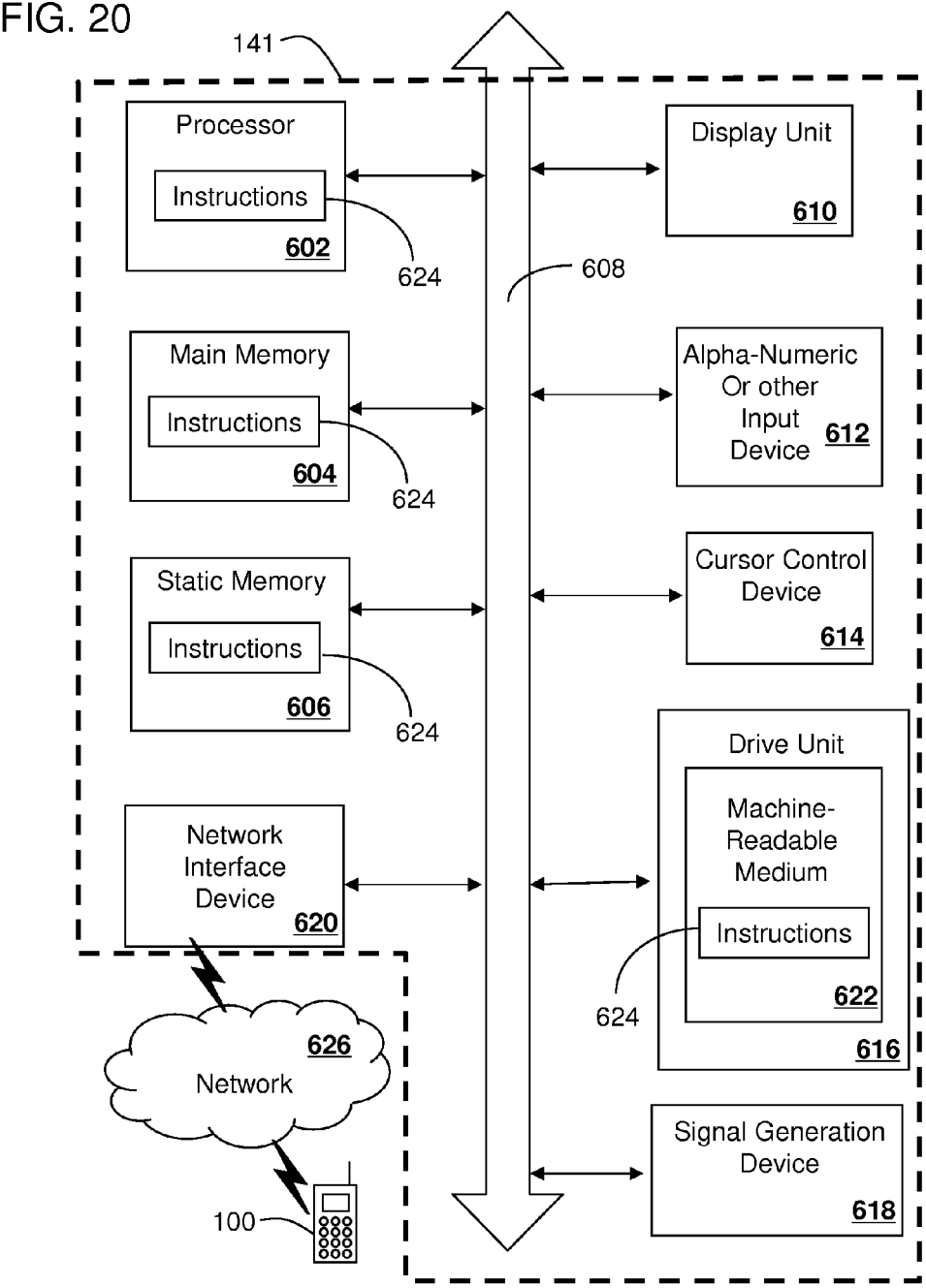

METHOD AND DEVICE FOR TOUCHLESS SIGNING AND RECOGNITION

CROSS-REFERENCE TO RELATED APPLICATION

This application claims the priority benefit of U.S. Provisional Patent Application No. 60/865,166 entitled "Method and Device for Touchless Signing and Recognition" filed Nov. 9, 2006, the entire contents of which are hereby incorporated by reference.

This application also claims the priority benefit of U.S. Provisional Patent Application No. 60/865,167 filed Nov. 9, 2006.

FIELD

The present embodiments generally relate to the field of user interfaces, and more particularly to signing and recognition using a user interface.

BACKGROUND

Mobile communication devices such as cell phones generally include a keypad and display for allowing a user to interact with mobile device applications. A user can navigate through menus presented on the display of the mobile device by pressing one or more keys on a keypad. Some keypads include a navigation pad which allows a user to navigate menus on the keypad. Mobile devices, such as cell phones or portable music players, are generally limited in size, and thus have small keypads. The small size of the keypad can limit the ease at which users can type on the small keypad, or navigate menus on the display via a keypad, to interact with the mobile device. Such keypads have keys with a touching area that is generally smaller than the size of a user's fingertip. The keypad and the navigation pads are touch-based which require physical user interaction. That is, a user must physically touch the keypad or navigation pad to navigate through a menu system on the display.

SUMMARY

One embodiment is a touchless user interface device for finger signing and recognition. A finger sign is a movement of a finger in a touchless sensing space for conveying information. The touchless user interface can include a sensory device for tracking a movement of a finger in a touchless sensing space, and a recognition engine for recognizing at least one pattern in the movement. The at least one pattern can be an alphanumeric character or a finger gesture. The touchless user interface can include a display for visually displaying the at least one pattern, and an audio module for audibly presenting the at least one pattern. A controller can be included to create a trace of the movement received from the sensory device. The controller can identify finger start and finger stop actions from the trace. The trace can be a spatio-temporal feature vector that identifies a style of touchless signing. Characteristics of touchless finger movement can be captured in the trace. The trace can be a differential trajectory, a positional trace, an acceleration trace, or a combination thereof. The recognition engine can be a Neural Network (NN) or a Hidden Markov Model (HMM) trained on traces or a combination of traces.

Embodiments of the invention are also directed to a mobile device for touchless finger signing and recognition. The mobile device can include a sensor device for tracking a movement of a finger in a touchless sensing space, and a recognition engine for identifying at least one pattern in the movement and providing predictive texting in view of the at least one pattern. The mobile device can include a controller for creating a trace from the movement. The trace can be a differential trajectory that incorporates spatial and temporal information of the finger movement. The recognition engine can include a neural network (NN) or a Hidden Markov Model (HMM) to process the trace and classify the at least one pattern as an alphanumeric character or a finger gesture. The mobile device can provide email composition services, text entry services, navigation services, or text messaging services for touchless signing applications. The mobile device can also provide biometric identification services for touchless signing to authorize secure access to a service.

BRIEF DESCRIPTION OF THE DRAWINGS

The features of the embodiments, which are believed to be novel, are set forth with particularity in the appended claims. Embodiments, together with further objects and advantages thereof, may best be understood by reference to the following description, taken in conjunction with the accompanying drawings, in the several figures of which like reference numerals identify like elements, and in which:

FIG. 1 is a mobile device for recognizing touchless finger movements and gestures in accordance with an embodiment of the inventive arrangements;

FIG. 2 is an illustration of a touchless sensing space generated by the sensor device of FIG. 1 in accordance with an embodiment of the inventive arrangements;

FIG. 3 illustrates exemplary applications for touchless finger signing in accordance with an embodiment of the inventive arrangements;

FIG. 20 is a diagrammatic representation of a machine in the form of a computer system within which a set of instructions, when executed, may cause the machine to perform any one or more of the methodologies discussed herein.

DETAILED DESCRIPTION

Figure 4:
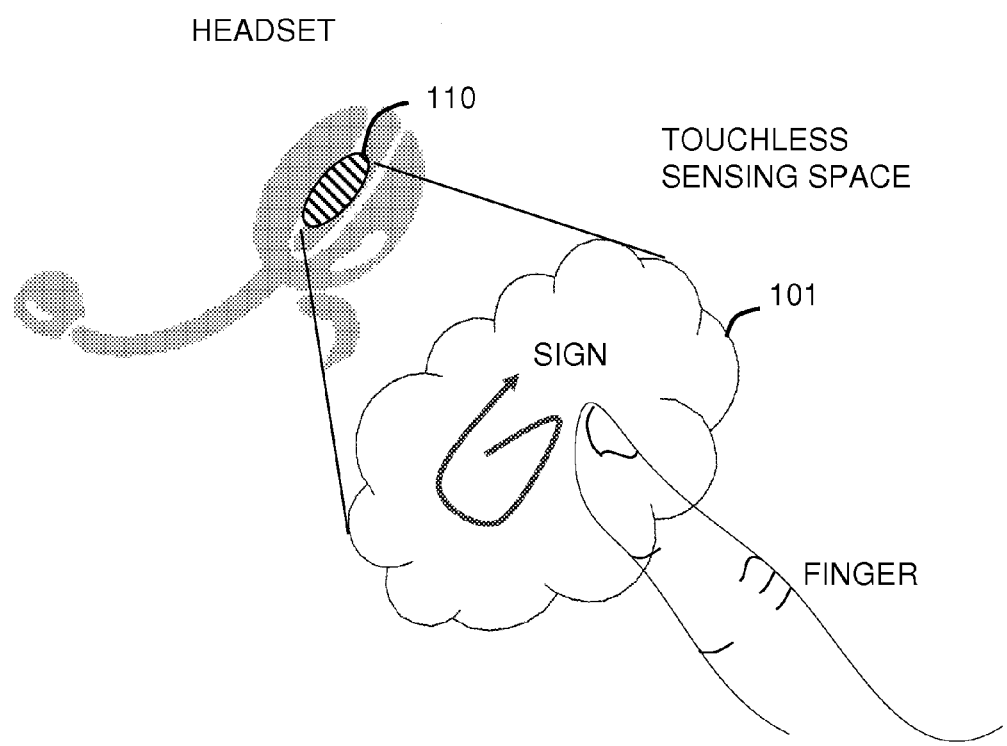
FIG. 4 is a headset for recognizing touchless finger movements and gestures in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a midlet, a source code, an object code, a shared library/dynamic load library and/or other sequence of instructions designed for execution on a computer system.

The term "space" can be defined as exhibiting a two or three-dimensional aspect. The term "sensory space" can be defined as a two or three-dimensional volume. The term "field" can be defined as exhibiting a two-dimensional or three-dimensional aspect. The term "control" can be defined as a handle to an object which can adjust one or more attributes or references to the object. The term "control action" can be defined as a button press, a soft-key press, a selection, a scroll, an entry for activating a control. The term "jitter movement" can be defined as a brief localized motion. The term "absolute location" can be defined as a one to one mapping of a first location to a second location. The term "relative location" can be defined as a second location in relation to a first location, or a displacement in a sensory space. The term "acquire" can be defined as creating a handle to an object. The term "select" can be defined as selecting an object that has been acquired. The term "handle" can be defined as a reference to an object. The term "touchless" can be defined as not requiring physical contact. The term "touchless control" can be defined as a control that can be handled and selected without requiring touching of an object, although actual physical contact may be made. The term "sign" can be defined as drawing a pattern in air using a finger, such as sign language, but using a finger instead of a hand. The term "signing" can be defined as the act of moving a finger in the air to draw a character, letter, or symbol. The term "recognizing" can be defined as identifying a finger sign. The term 'trace' can be defined as a representation of a sign in feature space, wherein the representation contains salient features of the finger movement. The term "finger gesture" can be defined as a finger sign for performing an action. The term "pattern" can be defined as an outline or contour that is repeating or non-repeating, and can be an alphanumeric character such as a letter, a number, or character. The term "pause" can be defined as a temporary pause.

One embodiment is directed to a method and device for recognizing touchless signs. Referring to FIG. 1, a sensing device 110 is shown. As illustrated, the sensing device 110 can be used in conjunction with a mobile device 100. The mobile device 100 may be a cell phone, a portable music player, a memory storage unit, a security device, a personal digital assistant, a laptop, a notebook computer, or any other suitable communication device. The sensing device 110 may attach to the mobile device 100 as an external accessory, or it may be internal to the mobile device. Moreover, the sensing device 110 is not limited to the position shown. For instance, the sensing device 110 can attach along side the mobile device, near a top of the display, or near the bottom of a keypad. The sensing device 110 can generate a touchless user interface that allows a user to interact with the mobile device 100 through touchless finger actions, such as a finger sign, or a finger gesture.

Referring to FIG. 2, the sensing device 110 can generate a touchless sensing space 101 wherein a user can interact with the mobile device 100 via touchless finger movements or gestures. A user can position a finger within the touchless sensing space 101 to interface to the mobile device 100. The touchless sensing space 101 can be separate from any surface of the mobile device, display, or keypad. In another arrangement, the touchless sensing space 101 can project on a surface to function like a touch screen or a touchpad. In practice, a user can motion a finger sign or a finger gesture in the touchless sensing space 101 to acquire and handle a control of the mobile device. In one aspect, the sensing device 100 and sensing space 101 allow a user to perform touchless character recognition. For example, a user can move the finger in the touchless sensing space 101 and draw out a character 140. The sensing device 110 can recognize the character from the finger movement, and present a pattern 146 corresponding to the finger sign 140. For example, a user can finger sign the letter 'e' 140 and the sensing device 110 can present the text pattern 'e' on the display. The sensing device 110 can enter the pattern into an application such as a notepad application, an email message, a dictation application, a phone number dialing application, or any other application which can process textual information, such as letters, characters, of symbols. The sensing device 110 or the mobile device 100 can also provide predictive texting to suggest words in view of the touchless letters.

Referring to FIG. 3, exemplary applications for touchless signing are shown. As one example, touchless signing can be used to enter an address into a navigation system or application. As another example, touchless signing can be used for text messaging. A user can enter a sequence of finger signs to spell out a word. In another arrangement, finger gestures associated with complete words can be entered. As another example, touchless signing can be used for biometric identification. A finger signature can be validated to authorize access to a service. For example, the sensing device 110 may be on a kiosk or a credit card payment terminal. Instead of authorizing a transaction via touchpad or touch screen signing, a user can perform touchless signing A recognition engine can identify a touchless writing style of the user to verify an identity of the user. In addition to recognizing finger signs, such as characters, the sensing device 110 can verify an identity of a user based on the user's finger signing style. The verification can be in combination with another form of presented identity, such as a credit card pin number, or a biometric voice print. The biometric identification can also be for accessing a web site or a service on a cell phone. For example, a user of a cell phone desiring to perform a wireless transaction may require a proof of identify. The user can perform a finger signature as validation. It should also be noted, that the user can perform touchless signing letter by letter at the same point in the touchless sensing space 101. In such regard, the signature may not be spelled out across the touchless sensing space though the signature may be presented correctly on the display.

In touchless finger signing, the letters can actually overlap as the user repositions the finger to a center spot in the touchless sensing space for the creation of each letter in the signature. In another aspect, the biometric identification can be evaluated in combination with a credit card. For example, a mobile device may include a credit card sweeper, and the user can sign a transaction for the credit card via touchless finger signing. As another example, touchless signing can be used for composing emails. In such regard, a user can compose a text message letter by letter via touchless finger movements. A predictive text engine can suggest completed words in view of the recognized finger signing letters. In another aspect, finger gestures can represent words. In such regard, a user can compose a text message word by word via finger gestures. In another aspect, the finger gestures can perform control actions on the phone, such as automatically performing a hot-key operation to access a menu control.

As shown in FIG. 4 the sensing device 110 can be used with a headset 121. The sensing device 110 may be attached to the headset 121 or integrated within the headset 121. The headset 121 can be a standalone device capable of controlling all aspects of audio or media associated with the headset 121. The headset device can also be an earpiece or other hearing device that fits within or attaches to the ear. The headset 121 can also provide wireless connectivity, such as Bluetooth, to allow short range communication with another device, such as the mobile device 100. In one aspect, the mobile device 100 can determine how controls of the headset 121 are adjusted.

In one arrangement, options for adjusting controls on the headset can be provided by the mobile device 100. The sensing unit 110 can send commands through a wireless communication link of the headset 121 to the mobile device 110. The commands can be received by the mobile device 100 for adjusting the controls of the headset 121. For example, the headset 121 may have only limited controls such as a volume due to the small size of the headset 121. The sensing unit 110 can send commands to the headset 121 or the mobile device 100 for performing other features, such playing a voice mail, or scrolling through messages. In another arrangement, the headset 121 can have complete control over audio and media managed by the headset 121. For example, a user can change a control on the headset directly 121 without going through a mobile device 100. In any case, a user can operate the headset 121 via touchless finger movements or gestures within the touchless sensing space 101.

Figure 5:
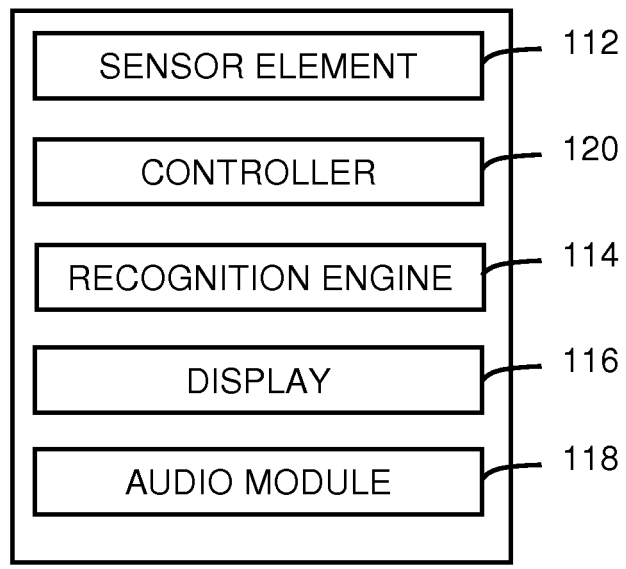
FIG. 5 is a block diagram of a sensor device in accordance with an embodiment of the inventive arrangements.

Referring to FIG. 5, a block diagram of the sensing device 110 is shown. The sensing device 110 can comprise more or less than the number of components shown, and is not limited to those shown. Operational aspects of the sensing device 110 are described in U.S. Patent Application 60/740,151 and U.S. Patent Application 60/740,358 by the same inventor and hereby incorporated by reference. The sensor device 100 can include at least one sensor element 112 for tracking a movement of the finger in the touchless sensory space 101, a controller 120 for creating a trace of the movement, a recognition engine for identifying at least one pattern in the trace, a display 116 for displaying the at least one pattern, and an audio module 118 for audibly presenting the at least one pattern. Notably, all components do not have to be included together, as some components can operate independently of others, or without reliance on the other components. Moreover, certain processing aspects can be embodied within the mobile device 100 as well.

Briefly, the sensing device 110 can comprise one or more transmitters and receivers as sensing elements, such as an array of ultrasonic transducers, micro-acoustic microphones, micro speakers, or micro-electro mechanical MEMS microphones for transmitting and receiving audio signals. In another arrangement, the sensors can be CCD camera elements, CMOS floating gates, optical elements, LED elements, or MEMS camera elements for receiving light. The sensing elements are spaced sufficiently close together to fit on the mobile device 100 or the headset 121. The sensing device 110 can identify an absolute location or relative movement of a finger in the touchless sensing space 101. The sensing space can be created in accordance with a touchless sensing unit described in U.S. Patent Application 60/779,868 and U.S. Patent Application 60/781,179 by the same inventor and hereby incorporated by reference. In one arrangement, but not herein limited, the sensing space can be generated based on principles of echo-location detection as is described in U.S. Patent Application 60/740,358 by the same inventor and hereby incorporated by reference. It should be noted, that the overall size of the sensing device 110 can be reduced for placement on the mobile device 100 or the headset 121.

The controller 120 can be operatively connected to the sensor element 112 for receiving finger movement information. For example, the sensor element 112 can send an absolute location or a relative displacement of the finger in the touchless sensing space 101. The controller 120 and the recognition engine 114 may be implemented in software by a processor such as a microprocessor or a digital signal processor (DSP), or any other suitable electronic device having associated memory or programmable readable and writeable memory storage. The controller 120 and the recognition engine 114 may also be implemented in hardware such as an Application Specific Integrated Circuit (ASIC) or Field Programmable Gate Array (FPGA), or any other suitable hardware. The ASIC can be digital or analog based. The location and displacement may be represented as Cartesian coordinates, pixels, time, or distance an is not limited to such. The sensing device 110 may also include a memory for storing data, such as tracking information.

Figure 6:
FIG. 6 is a recognition engine in accordance with an embodiment of the inventive arrangements.

The recognition engine 114 can recognize a pattern from the finger movement creating the finger sign or finger gesture. For example, a user may sign a character, such as the letter 'a' in air in the touchless sensing space 101. The recognition unit 114 can recognize the 'a' pattern from a trace of the finger movement and output the letter 'a' as a result, for example, to the display 116. The recognition engine 114 can recognize any pattern such as an alphanumeric character or a finger gesture. The recognition engine can also include predictive texting to suggest word completions in view of the recognized letters. Referring to FIG. 6, the recognition engine 114 in one embodiment can include a neural network 200. In one arrangement, the neural network 200 can be a multilayer perceptron having an input layer, at least one hidden layer, and an output layer. The neural network 200 can be of other topologies such as a radial basis network, a time delay recurring neural net, or a principal component analysis front end neural network. As one example, the neural network 200 can be trained on a database of finger signs and finger gestures. The training may be user dependent or population dependent. In one arrangement, the neural network 200 can use a delta-bar momentum rule and back propagation for minimizing a mean square error during training. The neural network 200 can also include a self-organizing feature extractor (not shown) or a principal component feature extractor (not shown) for reducing a dimensionality of the input vector associated with the finger gesture. The neural network 200 can be trained off line, and the weights saved on the sensing device 110, or any other device providing communication to the sensing device 110.

Figure 7:
FIG. 7 is an audio module in accordance with an embodiment of the inventive arrangements.

In practice, the recognition engine 118 attempts to recognize a finger sign or a finger gesture with a certain accuracy. For example, the recognition engine 114 may inadvertently recognize an ampersand sign (e.g. &) as a numerical figure eight (e.g. 8). The display unit 116 can display the recognized pattern, which may or may not be the correct pattern. This allows the user to visualize the pattern recognized by the recognition engine 114. If the pattern is incorrect, the user can speak a voice command (e.g. "no") to inform the recognition engine 114 of the error. Referring to FIG. 7, the audio module 118 can include a voice recognition engine 124 for interpreting the voice command. Although the voice recognition engine can also be used for letter recognition, the touchless finger signs provide a level of inaudible privacy. The voice recognition engine 124 can accept or reject a pattern recognized by the recognition engine 114. The controller 120 can then discard the pattern, and the recognition engine 114 can present another pattern. If the pattern is correct, the user can speak a voice command (e.g. "yes") to inform the controller 120 to accept the pattern. The voice recognition engine 124 can be used in conjunction with the sensing device 110 to enhance an interactive experience. In one aspect, the user does not need to speak a voice command to accept the pattern. A default operation can automatically accept the pattern unless a voice command to reject the pattern is received.

Figure 8:
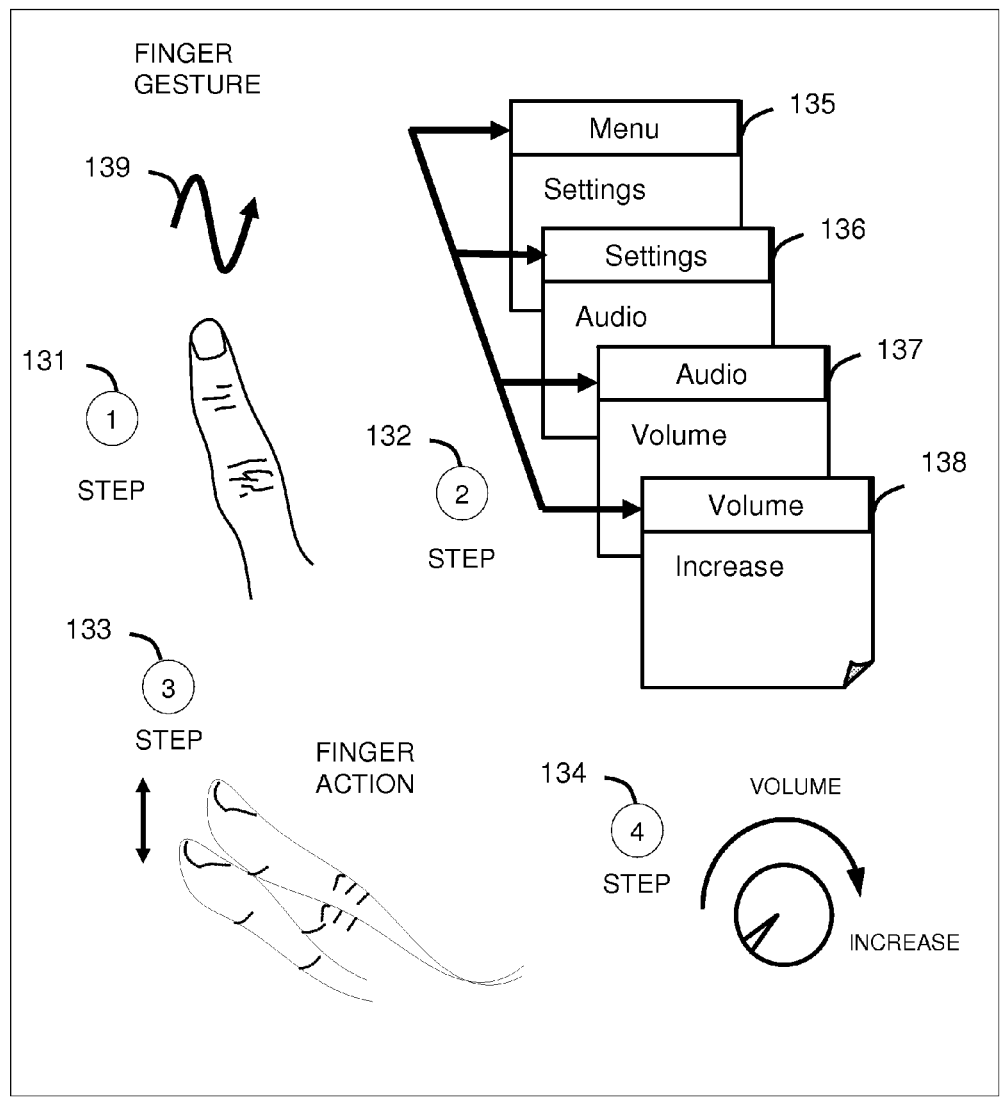
FIG. 8 is an exemplary finger gesture for touchless control in accordance with an embodiment of the inventive arrangements.

Briefly, a finger sign can be considered a movement of the finger in the touchless sensing space 101 that represents a letter, a numeral, a symbol, a character, or a control gesture. A finger gesture can be a pre-determined finger movement the user has associated with a task or action. The sensing device 110 can store a vocabulary of finger gestures and signs for recognition. As an example, a finger gesture may be a hot-key combination for controlling the mobile device. For instance, the finger gesture may perform a task that automatically traverses a menu hierarchy. Referring to FIG. 8, an exemplary use of a finger gesture is shown. As shown at step 131, a user can issue a finger gesture 139 (e.g. squiggle up) for accessing a handle to a volume control. The sensing unit 110 can recognize the finger gesture 139 and automatically traverse a menu 135 list for performing the task. At step 132, the controller 120 can traverse the settings 136 and audio 137 menu hierarchy of the mobile device 100 to reach an increase volume control 138. Upon accessing the increase volume control, the controller 120 can prepare the recognition unit 114 for touchless finger movements associated with performing the control. At step 133, the user can jitter the finger up and down. Consequently, at step 134, the controller 120 can increase the volume. Similarly, another finger gesture can be associated with decreasing the volume (e.g. squiggle down). In another arrangement, the touchless finger movement can be followed by a button press on the headset 121. For example, the user may access the volume control on the head set via physical touch, and then issue touchless finger movements, such as a circular movement in the air, for increasing the volume, thereby avoiding repeated pressing of the button. As another example, a first finger gesture may be a command request to access a mailbox, followed by an inbox, followed by a compose email. A second finger gestures may be to send the email and request a confirmation receipt of delivery. Notably, a finger gesture can represent any sequence of command actions a user associates with the finger gesture.

Figures 9, 10:
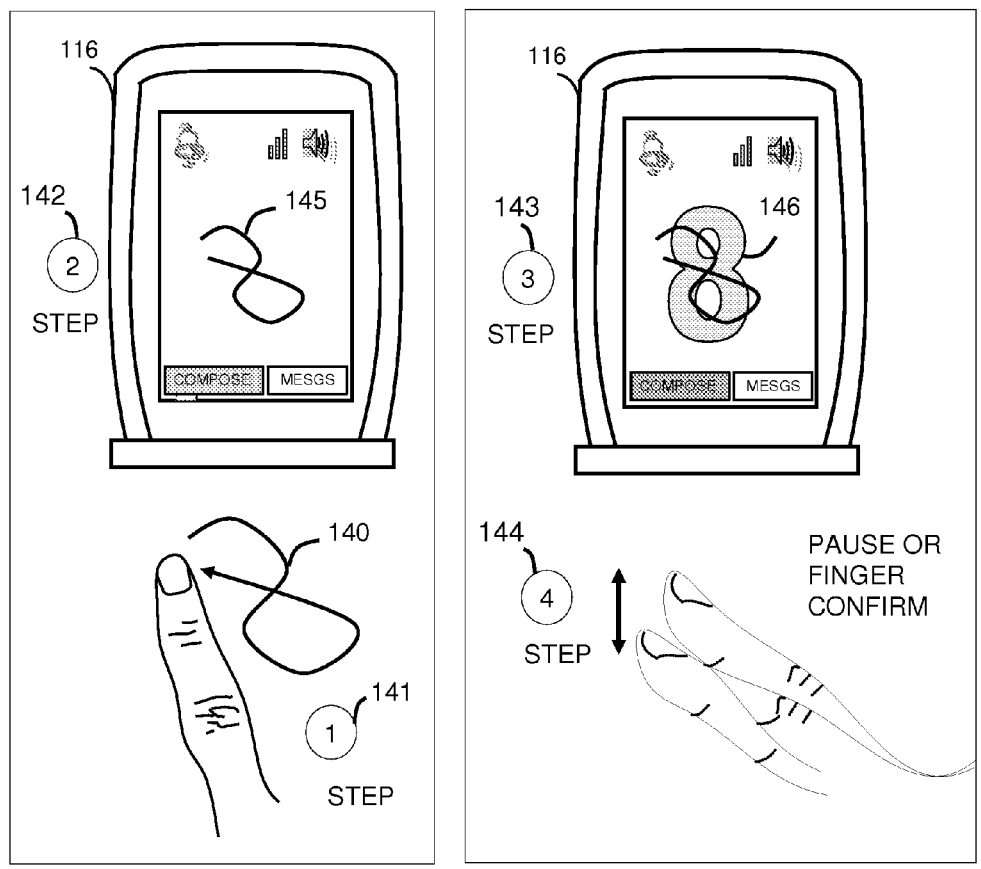
FIG. 9 is a depiction for touchless finger signing in accordance with an embodiment of the inventive arrangements.
FIG. 10 is a depiction for recognizing a finger sign in accordance with an embodiment of the inventive arrangements.

Referring to FIGS. 9 and 10, an exemplary depiction for touchless character recognition on a mobile device is shown. In particular, the depiction of FIG. 8 illustrates user steps associated with generating a finger sign, capturing a trace of the finger sign, and displaying the trace. The depiction of FIG. 9, illustrates steps of displaying a pattern recognized from the trace, and accepting the pattern. As an example, referring to FIG. 8, at step 141, a user can sign a symbol 140, such as a character, a letter, a numeral, or a finger gesture (the sensing device 110 can recognize alphanumeric characters, which comprise letters, characters, and other symbols). Notably, the finger is in the touchless sensing space 101 of the sensing device 110 (See FIG. 1) and is not in physical contact with a surface of the mobile device 100. That is, the finger does not need to contact a touchpad or a keypad of the mobile device 100. The finger is in the air above the mobile device 100 as shown in FIG. 2. Other embodiments project the sensing space on a surface of the mobile device which permit contact when finger signing. At step 142, a trace 145 can be produced on the display 116 of the mobile device. Briefly, the controller 120 tracks a movement of the finger in the touchless sensing space and creates a trace from the finger movement. The controller 120 can also identify finger start and finger stop actions from the trace for cropping the trace for the recognition engine 114. That is, the controller 120 can identify when the trace 145 begins and when the trace ends.

The trace is a feature vector of the finger sign. The trace is not merely a one to one physical tracing of the finger movement in the air. The trace is a feature vector which has characteristic features. In one aspect, a projection of the trace can be presented to represent the finger movement. At step 143, the recognition engine 114 can determine a pattern 146 associated with the trace 145, and the controller 120 can display the pattern 146 on the display 116. As shown, the pattern 146 may be the number eight ("8") which may be the sign 140 the user intended. Referring to FIG. 10, at step 144, the user can accept the pattern 146 by either pausing the finger or by moving the finger up and down. In such regard, the finger motion resembles a head motion of the user saying "yes". In another aspect, the user can reject the pattern 146 by moving the finger left and right, such as a person saying "no" by moving their head left and right. Notably, the finger confirm sign can be selected by the user and is not limited to the embodiments shown. In another arrangement, finger discard actions can be associated with rejecting the pattern.

Figure 11:
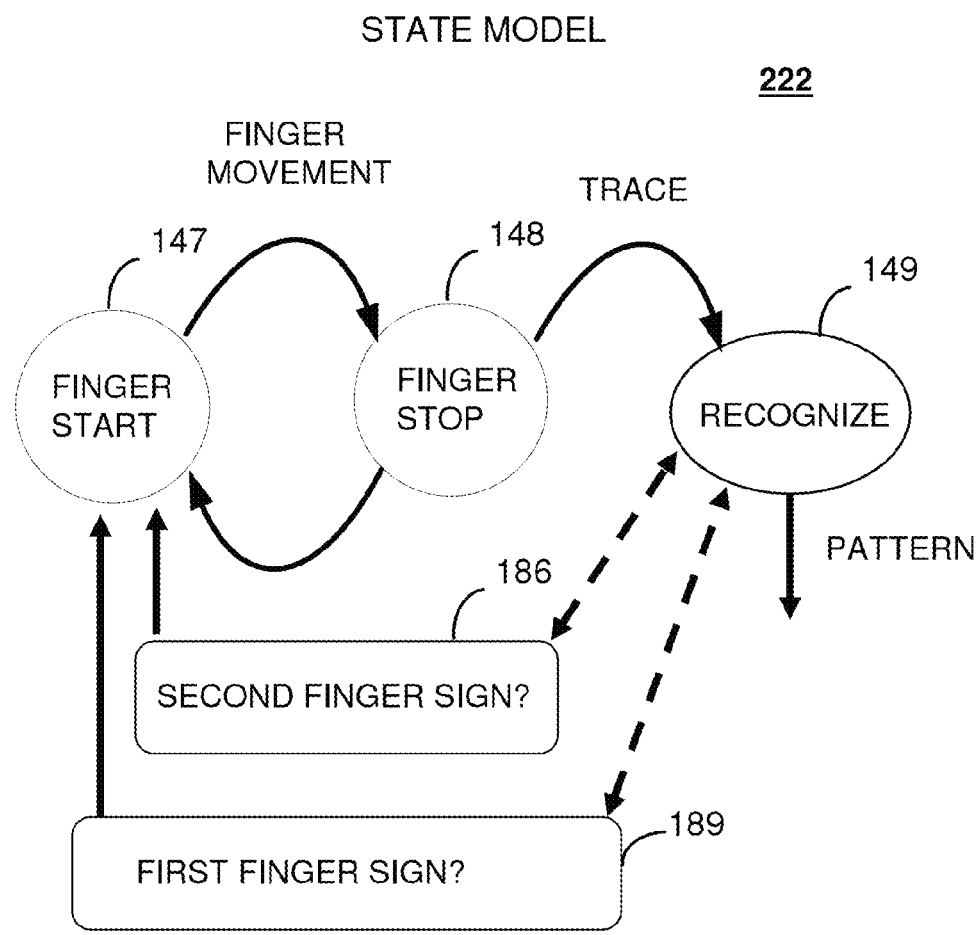
FIG. 11 is a state model for touchless control in accordance with an embodiment of the inventive arrangements.

The controller 120 can recognize when a finger sign corresponds to presenting a character, and when a finger sign corresponds to accepting or rejecting a pattern. The controller 120 can keep track of the patterns the recognition engine 114 identifies. That is, the controller 120 can operate using a state machine that determines how the recognized patterns should be interpreted in the context of a touchless user interface session. Referring to FIG. 11, a state diagram model 222 is shown. The state diagram model 222 can be in a finger start 147 state, a finger stop state 148, or a recognition state 149. When the controller 120 is in a finger start state 147, it is attempting to determine a finger stop motion. Upon identifying a finger stop motion, the controller proceeds to the finger stop state 148. The controller 120 can then generate a trace from the finger sign, and then proceed to the recognition state 149. Following, the recognition engine 149 can recognize the pattern given knowledge of which finger sign 186/189 it is trying to recognize. Knowledge of the finger sign 186/189 can help the recognition engine reduce the number of pattern matches. For example, a first finger sign 189 may be a letter between 'a' and 'z'. A second finger sign 186 may be presented upon completion of the first finger sign 189. Accordingly, the recognition engine has at least 26 patterns to match. In contrast, if the finger sign is for accepting a recognized pattern, the recognition engine may have only a few patterns to match, such as up/down or left/right. In practice, the controller 120 keeps track of which finger signs correspond to generating a character via touchless finger movement, and which finger signs correspond to accepting or rejecting a recognized character. The controller 120 can also communicate with the recognition engine 114 to determine if a recognized pattern corresponds to a character, such as a finger sweep motion of a letter, or to a finger confirm action, such as a finger up and down movement. Notably, the recognition engine 114 can distinguish between finger signs for characters and finger signs for accepting a recognition. In such regard, the recognition engine 114 and the controller 120 work together to determine finger signs. This allows the controller 120 to keep track of what signs can be expected. For sequential finger sign movements, the state model 222 is not limited to the states shown. That is more states can be added as the depth of the finger control is increased. For example, a touchless user interface operation may require a sequence of three different finger signs. Accordingly, the state diagram 222 can include at least three states for providing control.

Figure 12:
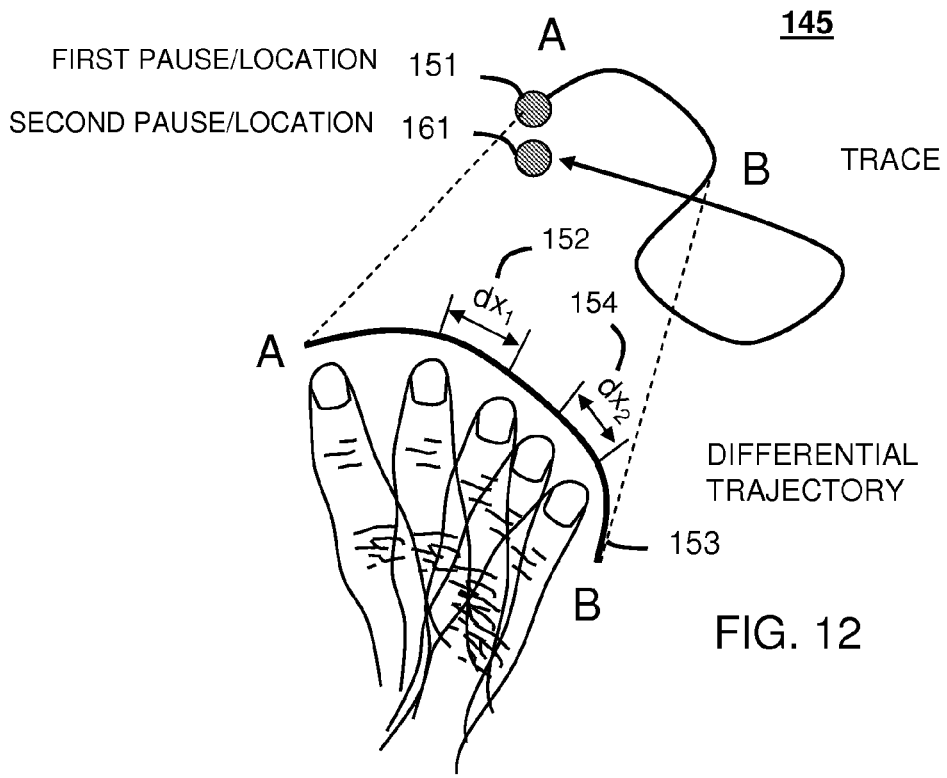
FIG. 12 is a differential trace of a finger movement in accordance with an embodiment of the inventive arrangements.

Referring to FIG. 12, an exemplary trace 145 is shown. The trace 145 can be defined by a start point A 151, and a stop point B 161. The trace 145 is a feature vector that can be processed by the recognition engine 114. In particular, the trace 145 contains features that are salient for characterizing the finger movement 140 (see FIG. 9). A salient characteristic may be representative of a group or an individual person. For example, some individuals draw a figure eight starting at the top, moving to the right, sweeping down to the left, sweep at the bottom, moving up the right and across to the left, and closing from at the top. Others may do the reverse. A salient characteristic can be the direction and the style by which the character is drawn. As illustrated, the trace 145 has a contour similar to the finger movement 140. This is for illustrative purposes only, and is not limited to being of a form similar to the finger movement 140. The finger movement 140 can be displayed on the display 116, but the features underlying the trace 145 are not necessarily presented on the display 116. In one arrangement, as shown, the trace is a loci of points (x,y,z) defining the location of the finger in the three dimensional sensory space 101. In this case, the trace is an actual representation of the finger movement in the touchless sensing space 101.

Figure 13:
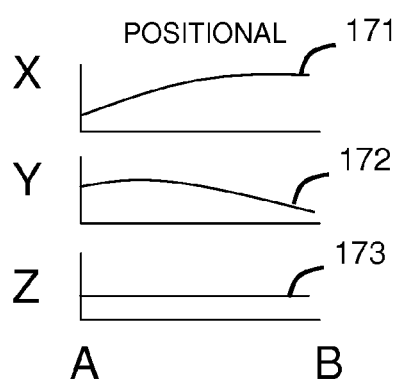
FIG. 13 is a positional trace in accordance with an embodiment of the inventive arrangements.
Figure 14:
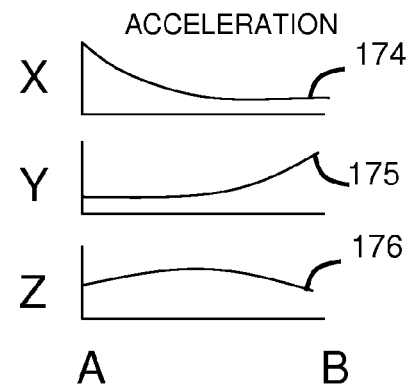
FIG. 14 is an acceleration trace in accordance with an embodiment of the inventive arrangements.

In another arrangement, the trace can also include, or solely comprise, a differential trajectory 153 of the finger movement in the three-dimensional sensory space 101. For example, the trace can be a vector (dx,dy,dz) of the finger movement over time. Referring to FIG. 13, exemplary direction traces for an X 171, Y 172, and Z 173 component are shown (e.g. Cartesian coordinates). The traces in FIG. 10 reveal the dx, dy, and dz values over time which can be stored as a matrix or a single vector. Referring to FIG. 14, exemplary acceleration traces for an X 174, Y 175, and Z 176 component. Notably, the differential trajectory 153 is characterized by the direction traces of FIG. 13 and the acceleration traces of FIG. 14. In such regard, the trace 153 includes spatial and temporal information. That is, the differential trajectory 153 includes, direction, velocity, and acceleration.

For instance, referring back to FIG. 12, $dx_2$ 154 is shorter than $dx_1$ 154 due to a slower finger movement on the outside curve of the figure eight in the region of $dx_1$ 154. That is, the finger moves over a larger distance in the same amount of time at a first location (dx 152) than at a second location (dx 154) due to the finger movement. Notably, the acceleration may be different for different characters and individuals. The recognition engine 114 can account for these differences. The acceleration feature and the differential trajectory can give the recognition engine 114 additional information for classifying the finger sign as a pattern. Notably, this temporal information (e.g. differential component) can provide characteristics of the finger sign unique to the generation of the finger sign. That is, the user may generate the finger sign 140 with the same handwriting style, which constitutes not only location information but also rate of change information.

For example, consider that the finger sign 140 is uniformly spaced based on location alone. In such regard, the recognition engine 114 would determine that the generation of the finger sign in the touchless sensing space was of constant velocity. This is similar to imagining the finger moving at constant velocity throughout the generation of the character, or letter. This does not provide good discrimination properties since all traces will be considered at the same speed. Now consider, that the finger sign 140 is sampled uniformly during generation of the finger sign. The sampling can also be varied in accordance with linear prediction or adaptive methods. In this case, temporal information, such as velocity and acceleration, can be captured in the sampling. In contrast, this does provide good discrimination properties since the traces are generated at different speeds along different features. In such regard, the recognition engine 114 can identify changes in acceleration along the finger sign, in addition to having the loci of points representing the pattern. Due to the differential information, the recognition engine 114 is provided additional information for recognizing characteristics of the finger sign that are unavailable with position information alone. This is similar to imagining different people having different writing styles. Each person may write the letters at a different speed and with a different textual articulation. The additional stylistic information conveyed by the rate of change helps the recognition engine 114 classify the finger swipe as a pattern, since it can be unique to the writing style.

Figure 15:
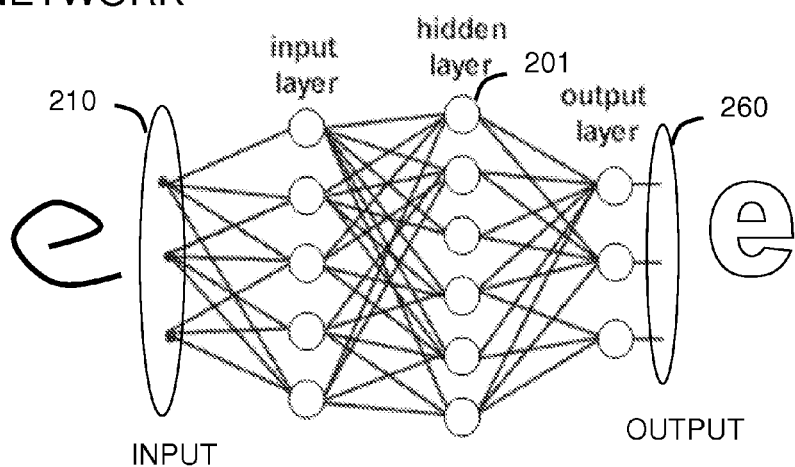
FIG. 15 is a Neural Network (NN) for recognizing a pattern from an input created via touchless finger movement in accordance with an embodiment of the inventive arrangements.

Referring to FIG. 15, an exemplary neural network 200 is shown. The neural network 200 can be included within the recognition engine 114. The neural network 200 can include an input layer, at least one hidden layer, and an output layer as is known in the art. Each of the layers can include processing elements 201 receiving synaptic connections (e.g. connection lines) from other processing elements. The processing elements 201 can provide a summation and an activation function for compressing a summed input to the processing element. Broadly stated, the compression function allows each processing element to model one feature of the input. Each of the synaptic connections can have an associated weight. In practice, an input signal is applied at an input 210 of the neural network 200 and an output is produced at an output 260 of the neural network 200. If the neural network 200 is properly trained, the neural network can perform recognition tasks such as recognizing a pattern from a trace. Training constitutes presenting input data to the neural network with corresponding desired outputs. During training, the neural network 200 adapts the weights of the synaptic connections to minimize an error between a generated output and the desired output. The neural net 200 can be trained with a back propagation algorithm that distributes errors to processing elements based on their learning performance. In general, the back-propagation algorithm performs a noisy gradient descent to find the synaptic weights that minimize an error in a performance surface, as is known in the art. Neural networks 200 are sensitive to initial weights and to the input patterns. The neural network 200 can also include a feature extractor front end such as a self-organizing map or a principal component analysis (PCA) front end (neither shown) to reduce a dimensionality and improve training performance and recognition. Alternatively, a robust feature set can be provided specific to the recognition task without use of a front-end feature extractor or as a complementary process to the front-end.

Figure 16:
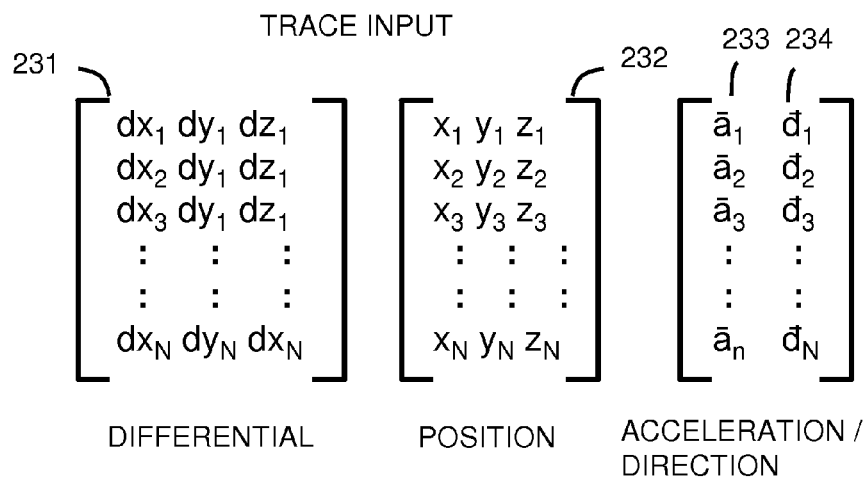
FIG. 16 is set of traces input to the neural network of FIG. 11 in accordance with an embodiment of the inventive arrangements.

Referring to FIG. 16, the input 210 to the neural network 200 can be a differential trajectory trace 231, a position trace 232, an acceleration trace 233, or a direction trace 234. The trace 145 is a robust feature vector that can be input to the neural network 200 for training and recognition. The feature vector contains spatial and temporal information that is unique to a writing style in a touchless sensory space 101. Notably, writing in a touchless sensory space 101 is not analogous to writing on a surface such as a piece of paper. Touch based writing introduces stiction, which applies resistance on the writing movement. In touchless writing, there is no resistance. Accordingly, a person's writing style in a three-dimensional touchless space is not analogous to the person's writing style on a two-dimensional surface. A touchless writing style provides features the neural network 200 can discriminate. That is, the neural network 200 can learn features of the trace 145 for recognizing the trace due to the touchless sensing. Recall, the trace 145 includes spatial and temporal information based on sampling the trace while the trace is generated. That is, the trace can be generated in real-time. The effective sampling rate can also be changed by selectively discarding samples, as one implementation. As previously discussed, the trace 145 can be a differential trajectory that captures stylistic information of the user, when the user is generating the finger sign or finger gesture. The input 210 can be just one of the aforementioned traces or a combination of the traces. The number of inputs to the neural network 200 are the number of elements in the trace. Notably, combining feature sets can improve a discrimination of the neural network 200.

The trace 145 can also be subject to front end compression. For example, the dimensionality of the differential trajectory can be reduced using various front end compression techniques. As an example, controller 120, which may be a DSP or ASIC, can perform principal component analysis (PCA) on the trace 145. PCA decomposes the signal into a set of principal axes and variances along the principal axes. The controller 120 can also perform a Karhunen Loeve Transform (KLT) which is a variant of PCA. The front end may also be a Kohenen Mapping or another data reducing technique such as a fast Fourier transform (FFT) or combination or variant thereof.

Figure 17:
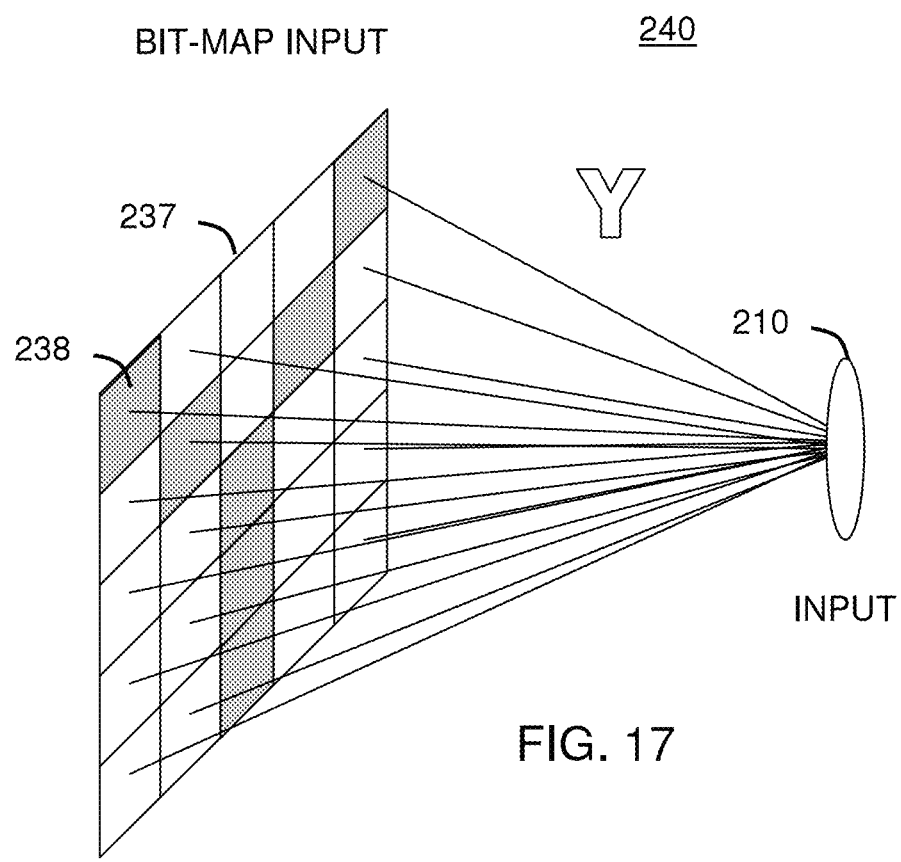
FIG. 17 is a bit-map input to the neural network of FIG. 11 in accordance with an embodiment of the inventive arrangements.

Referring to FIG. 17, the input 210 to the neural network 200 can also be a bit-map 240 of the finger movement 140. For example, the finger movement 140 defined by the loci of points (x, y, and z) can be superimposed on a grid 237 of binary values 238 having a reduced dimensionality. For example, the finger movement 140 may be sampled at 100 Khz and the bit-map 240 grid can be 5×5 (25 input points). Notably, the bit-map 240 provides a significant reduction in the number of inputs to the neural network 200. Reducing the number of inputs 210, also reduces the number of synaptic weights needed for storage, and accordingly, for recognizing finger signs. The bit-map however does not inherently include trace information such as differential trajectories. In particular, temporal information is not included in the bit-map 240 as a result of the superposition. Accordingly, the differential trajectories can be included as supplemental input with the bit-map 240 to the neural network 200 to improve discrimination performance.

Figure 18:
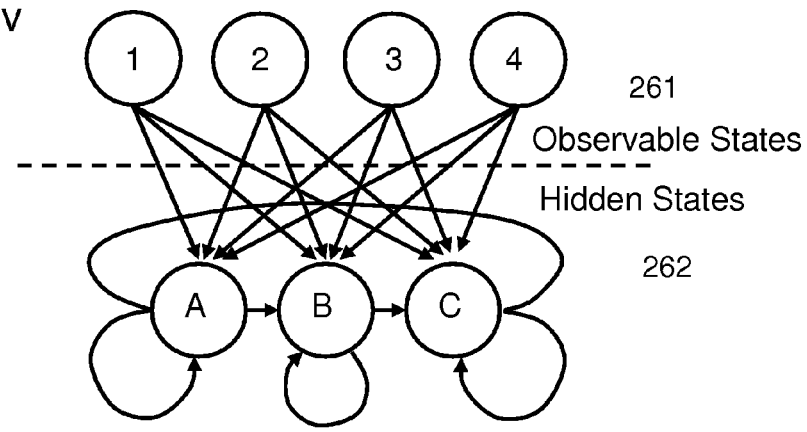
FIG. 18 is a Hidden Markov Model (HMM) for recognizing finger signs in accordance with an embodiment of the inventive arrangements.

The recognition engine 114 can also include a Hidden Markov Model to perform the finger signing recognition. Referring to FIG. 18, a Hidden Markov Model (HMM) is shown. Briefly, the HMM 260 can also be used for recognizing finger signs of for modeling control points of the finger movement. An HMM is a widely used statistical method for characterizing pattern sequences. The premise of an HMM is that a touchless finger sign can be characterized as a parametric random process, and that the parameters of the model can be determined in a well defined sense. The parameters of the model can correspond to points along the differential trajectory 153 that undergo change. For example, one state of the HMM may model a slow movement of the finger on a lower left contour of a figure eight pattern. The Markov model uses a stochastic process of state transitions to generate an output sequence, which constitutes modeling an input sequence. The Hidden Markov Model is a doubly stochastic process in which a second stochastic process contributes a transmission probability which governs the generation of the observed time series. The HMM can include observable states 261, and hidden states 262. Briefly referring to the trace 140 of FIG. 9, the finger sign 140 can represent the observable states 261, and the trace 140 can represent the hidden states. The underlying state sequence is hidden by the secondary stochastic process. Thus there are two main components to an HMM: the finite state sequence and the output probability distributions (also referred to as emission probabilities). The Markov chain synthesizes the state sequence, and the state transmission probabilities together create the observed time series. The observable time series provides evidence about the hidden path and the model parameters which generated that path sequence.

In practice, the trace 145 can serve as an input sequence to the HMM 260, and the HMM can produce the most likely state transition sequence corresponding to the finger sign 140. Notably, the hidden states 262 can capture the aspects of the touchless finger movement in the touchless space 101 that characterize the writing style of the user. Recall, the trace can contain spatio-temporal information due to the sampling of the finger sign 140 in real time. The differential trajectories can provide features characteristic of a user's writing style. These features are not generally captured in a static handwritten character. Different topologies of the HMM can be employed to exploit the features of the trace. The HMM 260 can employ single Gaussians, multiple Gaussian mixtures, or discrete probability distribution functions can be used for modeling the hidden states as is known in the art.

Figure 19:
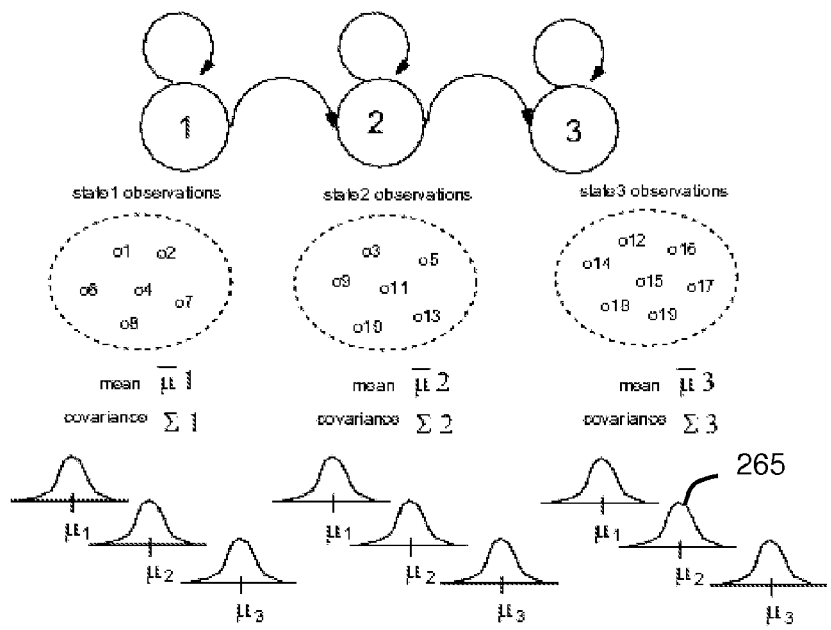
FIG. 19 is a diagram of a continuous single Gaussian HMM in accordance with an embodiment of the inventive arrangements.

Referring to FIG. 19, a diagram of an HMM using single Gaussians 265 is shown. Each state can include one or more Gaussians. Briefly, the single Gaussians can model first order statistics of a feature in the trace 145. First order statistics identify a feature mean and a feature variance. Recall, that the perceptrons 201 in the neural network 200 (See FIG. 15) attempt to model one feature of the trace vector. In a similar sense, the single Gaussians 265 model a feature of the trace 145. Notably, the HMM can be trained on the trace 145 which includes spatio-temporal information for characterizing a touchless writing style. Features of a touchless writing style can vary from features of a touch based writing style. Accordingly, the HMM 260 can be tuned for recognizing touchless finger signs.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

For example, FIG. 20 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A touchless user interface device, comprising:
   a sensor device for tracking a movement of a finger gesture in a three-dimensional touchless sensing space, and
   tracking features comprising a relative location, acceleration and movement of the finger gesture in the three-dimensional sensing space to produce a trace; and
   a state driven gesture recognition engine for
   learning gesture characteristics of a textual articulation and a non-stiction writing style in the three-dimensional sensory space from the acceleration and movement features of the trace;
   discriminating between a 2D writing style and a 3D writing style of the gesture characteristics; and
   classifying the finger gesture from the stylistic information upon identifying in the trace at least one pattern established from a finger start action and a finger stop action.

2. The touchless user interface device of claim 1, further comprising
   a display for displaying an alphanumeric character responsive to the finger gesture or a finger swipe; and
   an audio module for audibly presenting the at least one pattern.

3. The touchless user interface device of claim 1, wherein the sensor device is integrated within a mobile device, a headset, or an earpiece.

4. The touchless user interface device of claim 1, further comprising a controller operatively coupled to the sensor device and the state driven gesture recognition engine, the controller:
   emitting ultrasonic waveforms from ultrasonic transducers to reflect off a finger in a three-dimensional touchless sensing space;
   digitally sampling the reflected ultrasonic waveforms off the finger to produce a sampled reflected ultrasonic waveform;
   tracking via pulse echo detection a relative location and movement of the finger in the three-dimensional ultrasonic sensing space from differential time of flight waveform analysis of the sampled reflected ultrasonic waveforms to produce the trace;
   weighting a Time of Flight (TOF) ultrasonic distance measurement with a differential Time of Flight (dTOF) ultrasonic measurement for producing the location and the relative displacement as the finger accelerates and decelerates,
   creating the trace of the movement from the location and relative displacement received from the sensory device; and
   identifying finger start and finger stop actions from the trace for inputting continuous finger gestures to the state driven gesture recognition engine.

5. The touchless user interface device of claim 4, wherein the state driven gesture recognition engine is a neural network or Hidden Markov Model (HMM) that learns to discriminate between the 2D writing style and the 3D writing style to classify the at least one pattern and stylistic information of a writing style from the trace.

6. The touchless user interface device of claim 4, wherein the sensor device projects the touchless sensing space on or above a surface of a mobile device.

7. The touchless user interface device of claim 4, wherein the trace is a differential trajectory of an x, y, and z component of the movement.

8. The touchless user interface device of claim 5, wherein the neural network classifies the pattern using a spatio-temporal trace of the movement of the finger.

9. The touchless user interface device of claim 4, wherein a temporal trace is an acceleration vector.

10. The touchless user interface device of claim 4, wherein the state driven gesture recognition engine is a Neural Network or Hidden Markov Model that learns to discriminate between the 2D writing style and the 3D writing style to classify the at least one pattern from the trace.

11. The touchless user interface device of claim 4, wherein the controller performs biometric identification on a finger signing to verify an identity of a user.

12. The touchless user interface device of claim 4, wherein the controller performs a software action in response to the state driven gesture recognition engine recognizing the finger gesture.

13. A method for touchless sensing, comprising
   by way of a sensory device, tracking a movement of a finger gesture in a three-dimensional touchless sensing space, and
   tracking features comprising a relative location, acceleration and movement of the finger gesture in the three-dimensional sensing space to produce a trace;
   by way of a state driven gesture recognition engine,
      learning gesture characteristics of a textual articulation and a non-stiction writing style in the three-dimensional sensory space from the acceleration and movement features of the trace;
      discriminating between a 2D writing style and a 3D writing style of the gesture characteristics; and
      classifying the finger gesture from the stylistic information upon recognizing in the trace at least one pattern established from a gesture start action and a gesture stop action.

14. The method of claim 13, further comprising a controller that performs differential measurement for finger acceleration and deceleration, and by way of the state machine determines start and stop completions in view of the stylistic information conveyed by the rate of change.

15. The method of claim 13, wherein the controller provides text messaging services for touchless finger signing.

16. The method of claim 13, wherein the controller provides email services for touchless finger signing.

17. The method of claim 13, wherein the controller provides navigation services for touchless finger signing.

18. The method of claim 13, wherein the controller recognizes a touchless finger swipe.

19. A touchless signing engine comprising:
   a sensor device for tracking a finger movement in a touchless sensing space above a display and creating a trace from the finger movement from acceleration features of the finger movement by
   emitting ultrasonic waveforms from ultrasonic transducers to reflect off a finger in a three-dimensional touchless sensing space;
   digitally sampling the reflected ultrasonic waveforms off the finger to produce a sampled reflected ultrasonic waveform;
   producing a relative location and movement of the finger in the three-dimensional ultrasonic sensing space from differential time of flight waveform analysis of the sampled reflected ultrasonic waveforms,
   creating and presenting a trace of the location and the relative displacement received from the sensory device on the display
   and, a state driven gesture recognition engine for learning gesture characteristics of a textual articulation and a non-stiction writing style in the three-dimensional sensory space from the acceleration features of the trace;

discriminating between a 2D writing style and a 3D writing style of the gesture characteristics; and classifying the finger gesture from the stylistic information upon recognizing a pattern from the trace established from a finger start action and a finger stop action.

20. The touchless signing engine of claim 19, further comprising a controller for performing a software action in response to the state driven gesture recognition engine recognizing a finger signor swine.

21. The method of claim 13, wherein the sensor device performs the tracking by way of optical or camera elements.

22. The method of claim 13, wherein the sensory device performs the tracking by way of acoustic or ultrasonic sensors.

\* \* \* \* \*